United States Patent

[11] 3,580,377

| [72] | Inventor | Arthur H. Kiehl<br>708 Rancho Drive, San Luis Obispo, Calif. 93401 |
|---|---|---|
| [21] | Appl. No. | 791,373 |
| [22] | Filed | Jan. 15, 1969 |
| [45] | Patented | May 25, 1971 |

[54] CONVEYOR ARTICLE TRANSFER APPARATUS
13 Claims, 7 Drawing Figs.

[52] U.S. Cl. .................................................. 198/20
[51] Int. Cl. .................................................. B65g 47/00
[50] Field of Search .......................... 198/20, 76, 156

[56] References Cited
UNITED STATES PATENTS

| 1,460,448 | 7/1923 | Shampay | 198/20 |
| 1,513,765 | 11/1924 | Smith | 198/76 |
| 2,682,946 | 7/1954 | King | 198/20 |
| 3,184,032 | 5/1965 | Jonsson | 198/156 |

Primary Examiner—Richard E. Aegerter
Attorney—Oldham and Oldham

ABSTRACT: This apparatus is for automatic transfer of articles from one conveyor to an adjacent second conveyor and it includes frame means positioned between the conveyors and having endless band means journaled thereon for movement from adjacent one conveyor to a point adjacent the second conveyor. Pickup means are carried by the band means to engage an article on the one conveyor and move it to a point adjacent the second conveyor where article deposit means engage the article on the pickoff means and disengage it therefrom. Control means are provided to operate the article deposit means and place an article thereon onto a support on the second conveyor, and subsequently, by a similar apparatus, to return the article and normally its carrier means to its original position on the first conveyor.

PATENTED MAY 25 1971 3,580,377
SHEET 1 OF 4
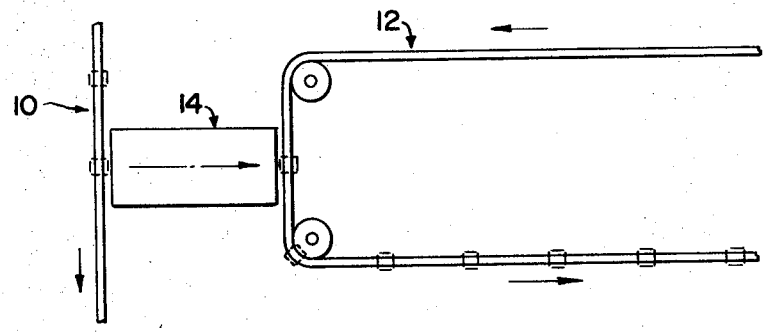
FIG.1
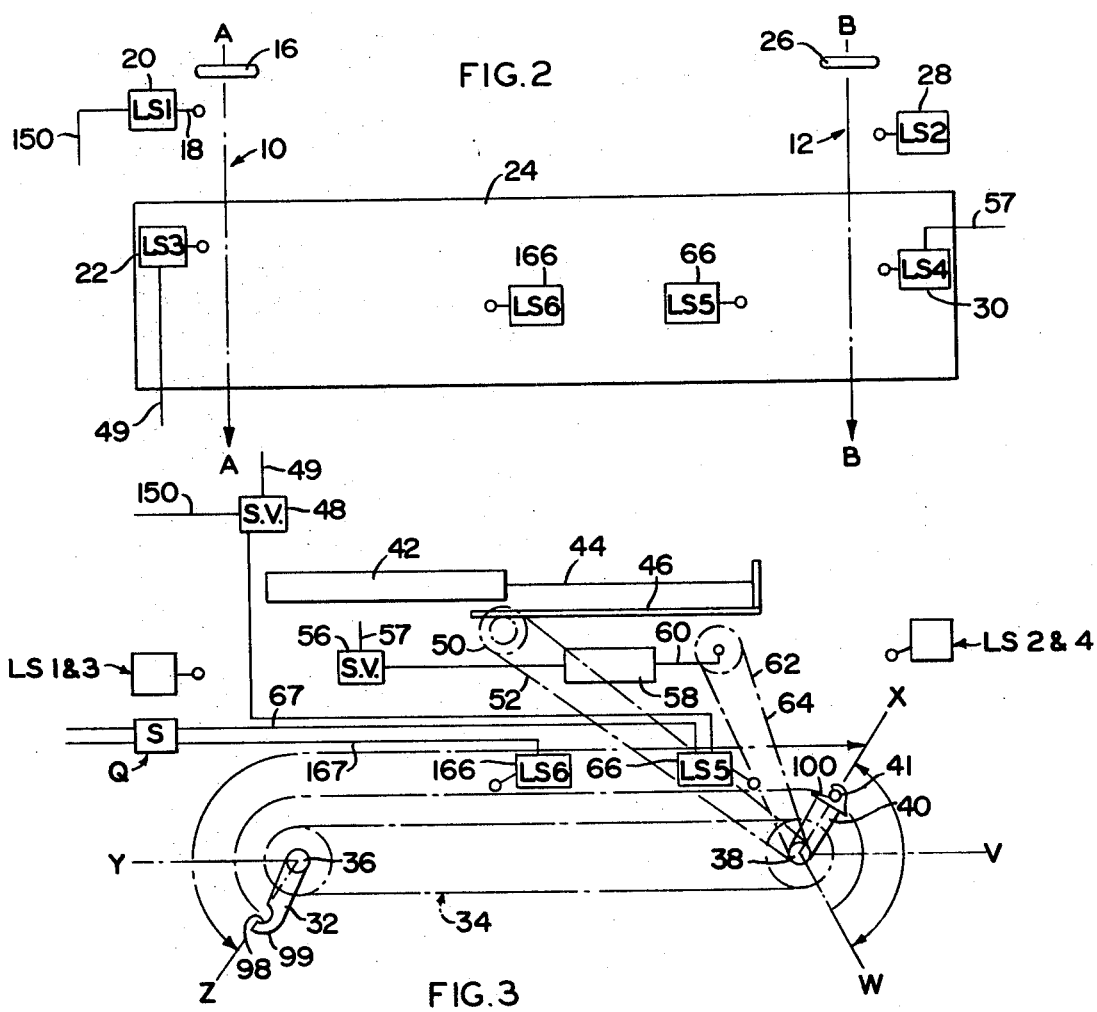
FIG.2
FIG.3
INVENTOR.
ARTHUR H. KIEHL
BY
Oldham & Oldham
ATTORNEYS.

INVENTOR.
ARTHUR H. KIEHL
BY
Oldham & Oldham
ATTORNEYS.

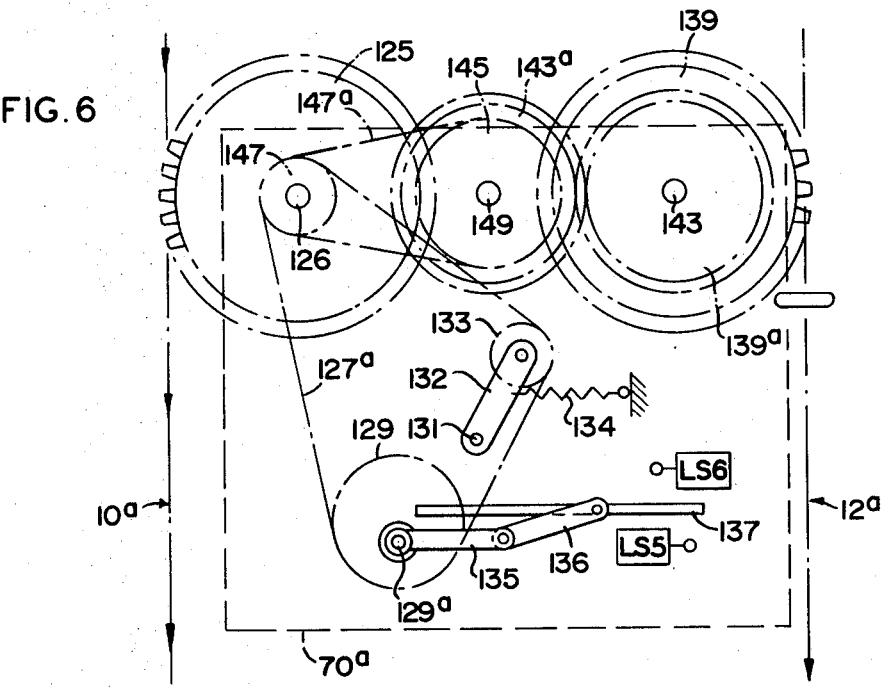
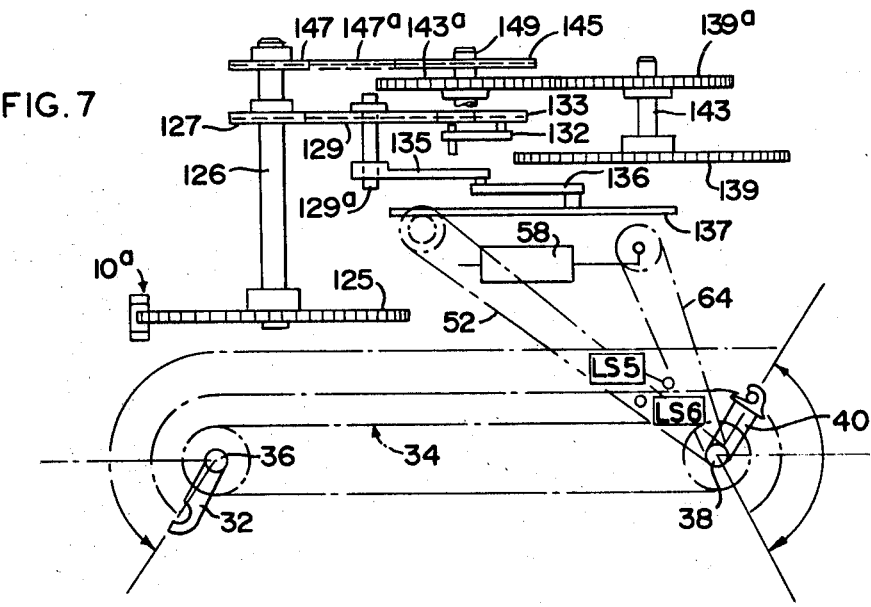

CONVEYOR ARTICLE TRANSFER APPARATUS

The present invention relates to automatic transfer apparatus whereby when a pair of adjacent parallel conveyors which are driven in timed operation to each other can have the transfer means pick up a hanger member or article on the one endless conveyor and transfer it automatically over to the other conveyor for deposit thereon.

Heretofore there have been various efforts made to provide means for removing articles from conveyors automatically and to process such articles in certain manners. However, insofar as I am aware, there is no apparatus available for automatically picking up an article from one conveyor, transferring the article to a remote position and then automatically depositing the article onto a second conveyor. Such type of an article transfer is desirable in many instances and use of automatic transfer apparatus would greatly reduce hand operations required for removing articles from one carrier medium, such as an endless chain conveyor, and placing the articles onto a second carrier, such as an endless chain conveyor, for further work or processing of the article being transported.

It is the general object of the present invention to provide a novel and improved automatic apparatus of relatively uncomplicated construction adapted to pick up an article suspended from one conveyor, move the article to a remote location, and then deposite the article onto a second carrier, such as an endless chain conveyor.

A further object of the invention is to operate an article transfer apparatus in timed relationship to each of two conveyors associated with the transfer apparatus and where article pickup, transfer and deposit in relation to the conveyors occurs in timed relationship to movement of such conveyors.

A further object of the invention is to provide special handling means for articles suspended from a hanger on an endless chain conveyor and wherein the hanger member can be picked up from the one conveyor and automatically be disengaged therefrom, transferred to a remote locality and have the hanger, with the article thereon, deposited upon a second conveyor.

A further object of the invention is to provide special handling means for the transfer of the article and/or hanger means from the second conveyor to another carrier or back to its original or a new position on the first conveyor, when desired.

Other objects of the invention are to provide an article transfer apparatus which can move longitudinally with an endless chain conveyor while disengaging an article therefrom, and then effect transfer of the article to a second conveyor; to provide automatic means for transferring drive from one endless conveyor to a second conveyor to facilitate article transfer between the conveyors in adjacent courses of movement thereof; to provide an electrically controlled system actuated by movement of the associated conveyors to energize transfer mediums to effect article transfer action in timed relationship between two conveyors; to provide a mechanically coupled drive means between two conveyors while effecting article transfer from one conveyor to the other; to provide a relatively uncomplicated mechanical system for controlled drive of article transfer means to facilitate article pickup from one conveyor, retention in a fixed position, and then for ultimate deposit onto a second conveyor.

The foregoing and other objects and advantages of the invention will be made more apparent as the specification proceeds.

In general, as one embodiment of the invention, the transfer apparatus of the invention includes a frame means positioned between the conveyors, endless chain or belt means journaled on the frame means for movement from adjacent one conveyor to a point adjacent the second conveyor, pickoff means secured to the chain means to engage an article or, usually, an article hanger on one conveyor and disengage it therefrom, and then to move such article to a point adjacent the second conveyor. Drive means connect to the chain means to move it through a controlled path, and article deposit means are operatively associated with the endless chain means and pickoff means adjacent the second conveyor to engage an article on said pickoff means and disengage it therefrom, and further control means engage the article deposit means to control the position and movement thereof and article release action thereof to deposit an article onto the second conveyor.

Reference now is made to the attached drawings, wherein:

FIG. 1 is a diagrammatic showing of a portion of two conveyors with which the apparatus of the invention is operatively associated;

FIG. 2 is a diagrammatic diagram of electrical control means adapted for use with the automatic transfer apparatus of the invention;

FIG. 3 is a diagrammatic showing of the article transfer apparatus of the invention;

FIG. 6 is a diagrammatic showing of a portion of an alternate mechanical means of powering the transfer apparatus as described and shown in FIGS. 1—5; and FIG. 7 is an elevation of the alternate mechanical means of power of FIG. 6.

When referring to corresponding members shown in the drawings and referred to in the specification, corresponding numerals are used to facilitate comparison therebetween.

Figure 4:
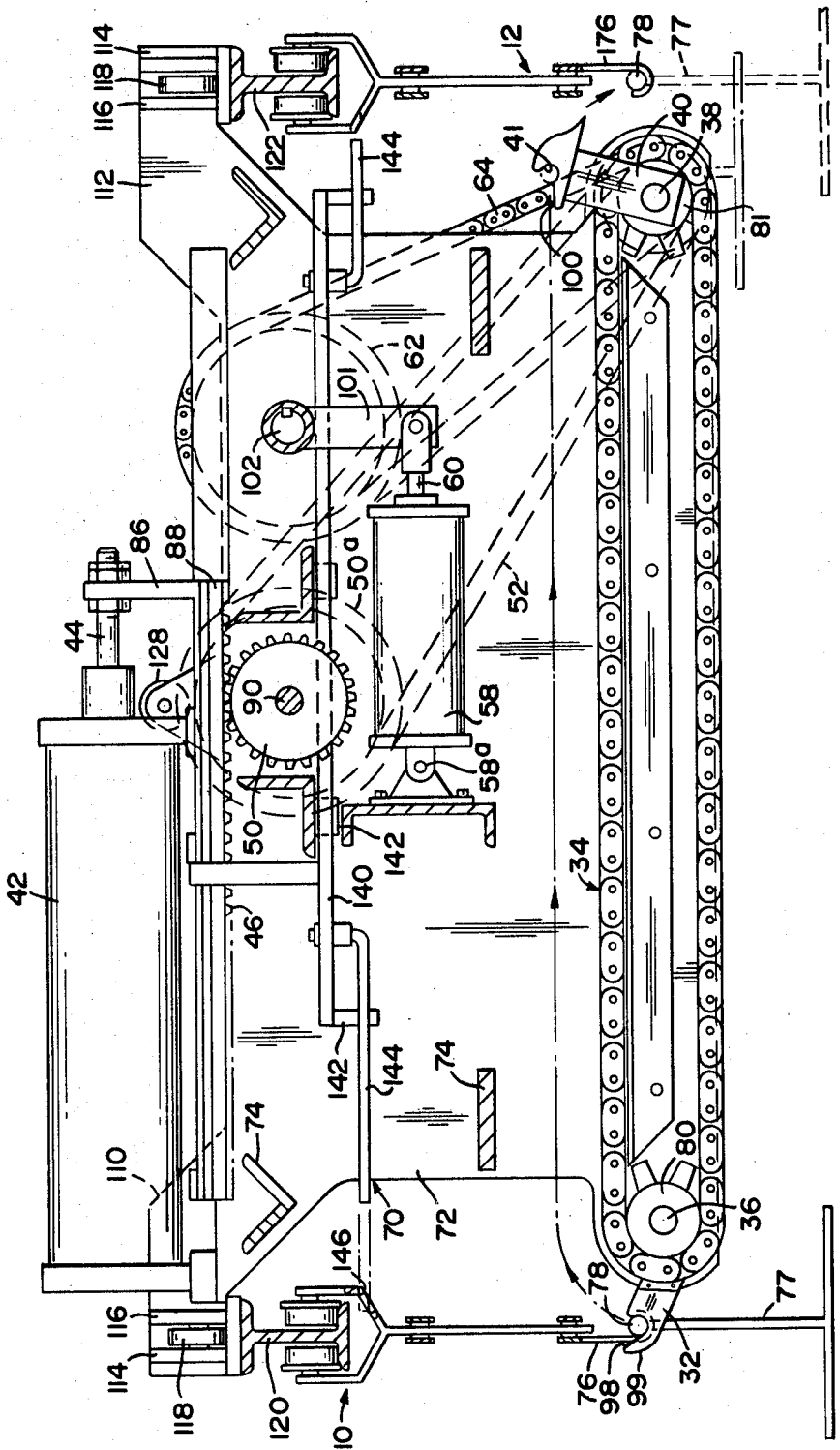
FIG. 4 is an enlarged fragmentary vertical section of article transfer apparatus of the invention.

Attention now is directed to the details of the structure shown in the accompanying drawings, and in FIG. 1, a portion of a conveyor 10 is shown in adjacent relationship to a portion of a conveyor 12. Positioned intermediate the conveyors 10 and 12 is an article transfer apparatus indicated as a whole by the numeral 14. These conveyors 10 and 12 can be of any conventional construction, but normally they would comprise chain conveyors, usually endless, and wherein the conveyors are positioned for at least a portion of the courses of their movement wherein the conveyors are adjacent and have parallel courses for article transfer action therebetween.

Conveyors 10 and 12 are usually driven at different line speeds but in a predetermined fixed ratio to permit a portion of the parts to continue on conveyor 10 and a portion of the parts to be transferred to conveyor 012.

FIG. 2 shows that as the conveyor 10 moves along its longitudinal axis represented by the line A–A, an operative means 16 thereon, such as a carrier hook, will initially strike an operative arm 18 of a limit switch 20 so as to close and/or energize the same. Upon continued movement of the conveyor 10, the operative means 16 will strike the control arm of a limit switch 3, indicated by the numeral 22, for a second control function in the apparatus of the invention. A frame means 24 is shown to indicate the article transfer apparatus diagrammatically and such apparatus extends over to the centerline B–B of the conveyor 12 and in this instance, an operative means 26 on the conveyor 12 will initially strike a limit switch 28, indicated at LS2 in the drawing and cause it to be actuated and continued movement of the conveyor 12 will cause the means 26 to contact the operative arm of LS4, indicated as a limit switch by the numeral 30 in the drawings for certain operative and control functions in the article transfer apparatus, as hereinafter described.

FIG. 3 is a front elevation of the diagrammatic apparatus indicated in FIG. 2 with certain additional means being indicated thereon, and in this instance one or more pickoff arms 32 are operatively positioned and carried by means such as endless bands or chain conveyors 34 which are suitably journaled on shafts 36 and 38 positioned parallel to and adjacent the conveyor axis lines A–A and B–B whereby the pickoff arms 32 are suitably controlled or driven by means hereinafter described for movement from the position shown in FIG. 3 over to a position adjacent the axial line B–B of the conveyor 12. The apparatus of the invention also includes one, or usually two, lock or deposit arms 40 which are operatively secured to the shaft 38 in the path of movement of an article or hanger means on the pickoff arm or arms 32 whereby such arms 40 which are normally retained in a fixed position and have rearwardly open notches 41 therein are adapted to engage with an article or means associated therewith, as hereinafter described, to strip the article from the pickoff arms 32 which have, when operated, been moved through the longitudinal axis A-A of the conveyor 10 for pick up of an article therefrom and transfer over to a position adjacent the conveyor 12. Specifically, a cylinder 42 is provided which has a piston 44 extending therefrom and carrying a rack gear 46 on the lower surface thereof. The cylinder 42 is adapted to be actuated by suitable means including a solenoid valve 48 which controls energization of the cylinder 42 to extend the piston 44 and which solenoid valve in turn is energized from a lead 150 extending from the limit switch 20 and controlling energy supply to the solenoid valve 48. Such rack 46 connects through a gear 50 to a drive chain 52 that in turn connects to and drives the shaft 38 for movement of the conveyor 34 through a path of from Z to X or vice versa. Thus, energization of the cylinder 42 by the limit switch 20 causes the cylinder 42 to move the arms 32 from the deposit position indicated at X in FIG. 3 through an arc to an inoperative position Z, or vice versa. With movement of the conveyor 12 towards the transfer apparatus, the means 26 contacts the limit switch 28 to move the deposit arms 40 operatively carried by the shaft 38 from an article deposit or release position indicated at radial line V in FIG. 3 up to their article-receiving position, indicated by the radial line X in FIG. 3. All limit switches referred to are low voltage and must be connected to conventional relay switches (not shown) in a control panel, which panel relays 110 volt current to the solenoid valves.

The solenoid valve 48 is preferably a four-way double solenoid momentary contact actuated valve, and thus when the limit switch 22 is momentarily closed by continued advance movement of the conveyor 10, another signal is sent to the solenoid valve 48 by lead 49 whereby the piston 44 (or piston rod) thereof is moved to the extended position shown in FIG. 3. This causes the pickoff arms 32 to move from the inoperative position indicated at line Z, through the article pickup position Y to the position indicated at line X, which places the article on such arms in the notches 41 on the deposit arms 40 provided in the apparatus. Further advance of the conveyor 12 then causes the limit switch 30 to be tripped and this switch connects to and actuates a solenoid valve 56, like the solenoid valve 48, by lead 57 and this causes the cylinder 58 operatively connected to and controlled by the solenoid valve 56, to move the arms 40 from the receive position indicated at line X, to and through the article deposit position indicated by line V, and to an inoperative position at line W. So that the movement provided for the arms 40 by the associated cylinder 58 is transmitted to such arms, a link arm 101 is mounted on shaft 102 and is operatively coupled to a piston rod 60 extending from the cylinder 58. The shaft 102 engages and drives a sprocket 62 and a drive chain 64 carried thereby that connects to the positioning means for the arms 40. Actuation of the cylinder 58 thus causes the arms 40 to be moved down through the longitudinal axis BB of the conveyor 12 and deposit a part on a conveyor hook on such conveyor and then such arms 40 continue their movement down into position W where they are clear of contact with any of the members suspended from the passing conveyor means 12. FIG. 3 shows a safety or limit switch 66 indicated as LS5 which is actuated only when a part being transferred from position or line Z to position X is not properly deposited by the arms 32 on the arms 40 and is retracted with such arms 32 on return movement thereof. FIG. 3 shows a safety limit switch 166 indicated as LS6 which is actuated only when the arm 32 does not reach a prescribed position on conveyor 34 in a prescribed time period. These limit switches 66 and 166 connect by leads 67 and 167 to a relay switch Q, or other control means to terminate drive of the conveyors 10 and 12 until the article and hanger means 77 are removed from the pickoff arms 32.

Hence, an electrically controlled, timed, functioning has been provided for the article transfer apparatus 14, and the timing or control action is taken directly from the associated conveyor means. Naturally if desired, the actuation of the limit switches 66 and 166 can shut off power to both cylinders 42 and 58 by actuating solenoid valve 48. Hence, the malfunction of the apparatus can be removed and the conveyors be reenergized by opening the limit switch 66 and 166 or changing the position thereof manually.

It should be realized that the conveyors 10 and 12 can be of any suitable construction and that any desired takeup or control means can be associated therewith whereby timed relationship can be obtained between the movement of corresponding portions of the conveyor means, such as any article supports carried thereby.

Figure 5:
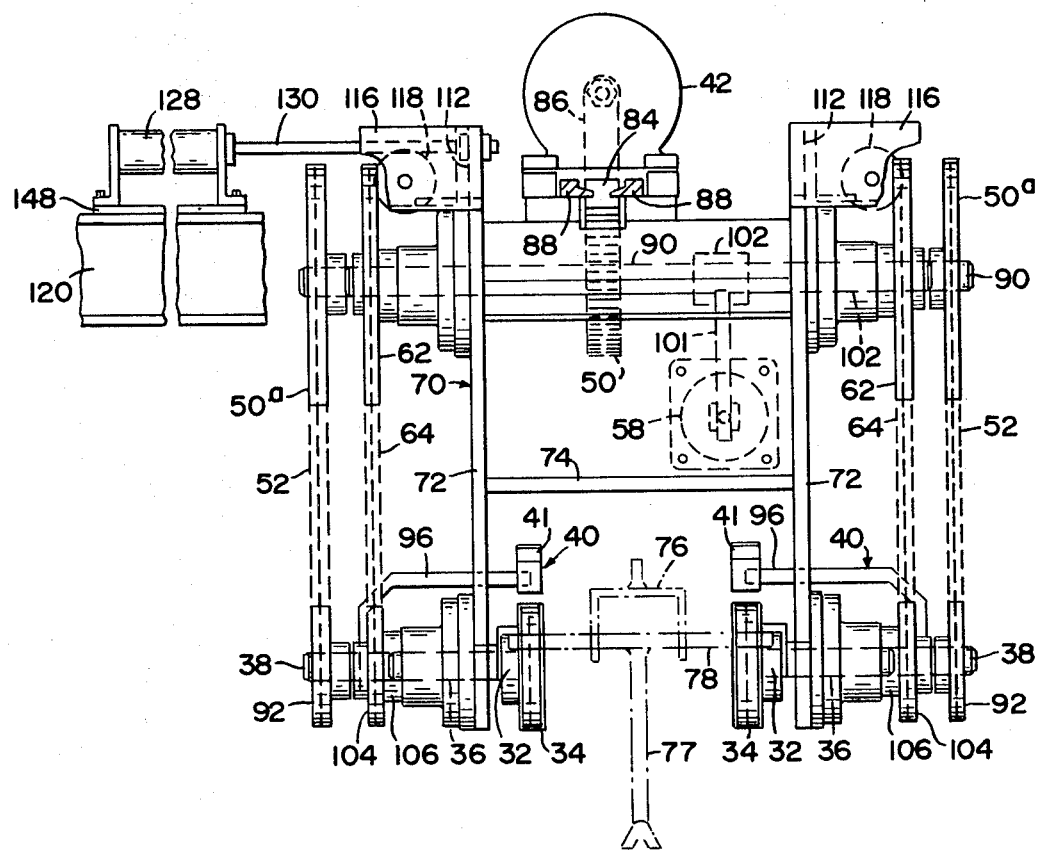
FIG. 5 is an end elevation of the article transfer apparatus of FIG. 4.

FIGS. 4 and 5 of the drawings show more details of the conveyors 10 and 12 and of the article transfer apparatus of the invention 14 that is positioned to extend therebetween. This article transfer apparatus normally will include a frame 70 that can be secured in a position extending generally between the conveyors 10 and 12, and particularly between parallel courses of movement of such conveyors, or such frame may be otherwise mounted as hereinafter described. The frame 70 includes vertical end plates 72 between which a number of reinforcing members 74 may extend and be secured to such end plates or frames to provide the mounting frame used to supply or support the components of the article transfer apparatus 14. Normally, conveyor 10 will have a number of differently designed carrier attachments—a portion will be so fixed that they will bypass all the limit switch arms, and it will have a portion, depending on the predetermined ratio of chain speeds, that will have a plurality of dependent substantial U or J-shaped hooks 76 secured thereto in longitudinally spaced relation. Conveyor 12 will have similar U-shaped hooks throughout at predetermined longitudinal spacing and these U-shaped hooks are in turn adapted to engage with hanger means 77 and where a top bar 78 is provided in each hanger means 77. The top bar is supported by the individual hooks 76 and protrudes longitudinally therefrom with the top bar 78 generally extending in the direction of the longitudinal axis of movement of the conveyor with which it is associated. FIGS. 4 and 5 also best show that a pair of endless chain conveyors 34 or the like, are suitably journaled on and extend between pairs of sprockets 80 and 81 that are operatively positioned on the frame 70. These sprockets 80 and 81 are journaled on the stub shafts 36 and 38 carried by spaced portions of the end plates 72 of the frame 70 whereby a more or less inverted U-shaped frame means is provided with an open center extending longitudinally of the frame means in the direction of between the conveyors 10 and 12. Corresponding members are positioned on each side of the lower portion of the frame and controlled by unitary means on the upper part of the frame. Each of these chain conveyors 34 has a pickoff arm 32 secured thereto and movable from the indicated retracted position Z shown in FIG. 3 up along and across the centerline of the conveyor 10 over to the position indicated at the line X in FIG. 3 for deposit of the article hanger onto the deposit or control arms 40 provided in the apparatus. FIG. 5 best shows how the conveyors 34 are spaced from each other and position the pickoff arms 32 in such a manner that they are adapted to engage the ends of the top bars 78 of the hanger means 77 when moved through the conveyor axis. Rapid movement of the chains or conveyors 34 is provided by means of the control cylinder 42 having a piston therein whose piston rod 44 is operatively secured to and carries the rack 46. This rack is supported by guides 88 and is secured by an extension arm 86 to the exposed end of the piston rod 44. The guides 88 engage this rack 46 to position it in mesh with gear 50 for controlled reciprocating movement. This gear 50 is secured to a shaft 90 which has sprockets 50a positioned on opposite ends of the shaft which extends across the frame 70. Hence arcuate movement of the shaft 90 causes arcuate movement of the sprockets 50a and drive of the chains 52 secured thereto adjacent each side of the frame. Such chains 52 in turn engage with individual sprockets 92 operatively carried by each of the stub shafts 38 to provide for arcuate movement of such stub shafts and thus of the roller chain belts, or conveyors 34 secured thereto whereby a controlled reciprocating, rapid movement is provided for these roller chains 34 and the pickup arms 32 carried thereby.

The control arms 40 normally are in operative position X so as to strip a hanger means 77 off of the pickoff arms 32 as the arms 32 are moved to a position aligned with such control arms 40 as the position X is slightly past the vertical, and the carrying notches of the arms 32 and 40 facilitate such transfer.

In turn, controlled deposit action of the control arms 40 is provided in timed relationship to movement of a J-hook 176 on the conveyor 12 along past these control arms 40. The drawings, FIG. 5, clearly show that a pair of the spaced control arms 40 are provided in the path of movement of the pickoff arms 32. Offset mounting sections 96 are present in the control arms 40 to support such control arms on stub shafts 38. The portions of the arms 40 having the notches 41 therein are preferably positioned in vertical alignment with the chains 34, 34 and wherein the pickoff arms 32 are positioned transversely laterally outwardly from these endless chains 34 whereby the arms 32 can be moved to and possibly slightly by the then fixedly positioned control arms 40 to effect the stripping of a hanger bar from the control arms.

The pickoff arms 32 have radial and angular inclined fingers and accurately shaped hook surfaces 98 and a relatively flat inclined back surface 99 connecting to the recessed hook surfaces 98. The deposit arms 40 have flat inclined surfaces 100 connecting to the hooks 41, whereby hanger means 77 can be transferred from the pickoff arms 32 to the deposit arms 40 without any possibility of lifting of the bars out of the notches 41 of the control arms 40 when the pickoff arms 32 are returned from the deposit positioned indicated at line X in FIG. 3 over to the retracted inoperative position for such arms, (line Z).

Controlled lowering action of the control arms 40 is provided by the cylinder 58 having its piston (not shown) connecting to a piston rod 60 connect to an extension arm 101 that is secured to a shaft 102 suitably journaled on and extending across the frame means 70. The cylinder 58 is pivotally secured to the frame means at 58a. Control sprockets 62 are carried by the shaft 102 at the ends thereof and have the chains 64 secured thereto and connecting to second driven sprockets 104 carried on hubs 106 journaled on each of the stub shafts 38. Each of the hubs 106 has one of the pair of control arms 40 positioned thereon. The sprockets 92 are keyed to the shafts 38.

In some instances, it is desirable that the entire frame 70 be caused to move longitudinally with the conveyors 10 and 12 when articles are stripped therefrom or deposited thereon, as desired. Thus, the frame 70 is shown as having upper sections or brackets 110 and 112 extending therefrom on the upper portions of the end plates 72, and these brackets have vertically extending flanges 114 and 116 that have a support roller or rollers 118 suitably secured thereto and positioned therebetween. The rollers 118 normally are at a proper vertical elevation so that they will engage the upper surface of a pair of parallel I-beams 120 and 122 provided adjacent and parallel to the conveyors 10 and 12 and normally thereabove to support the same. Thus the entire frame 70 and all transfer mediums and apparatus positioned thereon can be moved parallel to the axis of the conveyors 10 and 12 at the transfer station. The transfer apparatus can be caused to move longitudinally with and at the same speed as the conveyors as hereinafter described.

Axial movement of the frame 70 with the conveyor can be obtained by power means associated with the frame 70. The axial downstream movement of frame 70 may be assisted by an air cylinder 128 suitably operably positioned and attached to one or more of the I-beams 120 and 122 and operatively connected to the frame 70 by a piston rod 130 wherein cylinder would be powered with a preset minimum air pressure to reduce the force required by slide bar 140 to move the frame in the downstream motion. The slide bar 140 is secured to the frame 70 and actuated by rack 46 for movement longitudinally thereof as by being mounted in slide brackets or mountings 142. The slide bar or link 140 has an extension link 144 secured to each end thereof and the slide bar 140 is adapted to be moved longitudinally of the frame 70 whereby the extension link 144 can be brought out into engagement with a means associated with the conveyor 10 as indicated by the link or hole 146 indicated in FIG. 4 so that as the conveyor 10 is driven and transfer action is desired, the slide bar 140 would be moved out to its operative position to the left, and engage with a portion of the conveyor 10 to be moved as a unit therewith while supported on the rollers 118. Then a reverse actuation of the cylinder 128 can be provided when once actuated to retract and all components thereon to an upstream position for further movement of the entire unit 70 downstream with a portion of a conveyor 10 when removing the next article therefrom. The reverse actuation of cylinder 128 would be signaled by LS-4 (30) wherein through a delayed timing device full air pressure would be applied to cylinder 128 after arms 40 had reached position W. Of course, the same procedure can be used to actuate the frame 70 to cause it to move in unison with a segment of the conveyor 12 as an article is being deposited thereon, as shown in FIG. 4, if desired. The cylinder 128 is positioned on a bar 148 supported on and extending between the I-beams 120 and 122.

It should be realized that some mechanical connection (not shown) between the conveyors 10 and 12 is necessary to maintain uniform speed ratios therebetween.

It should be realized that a mechanical drive unit powered off conveyor 10 and 12 can be utilized to operate reciprocating action of the transfer apparatus through a series of sprockets and chains and lever arms in which case both cylinders 42 and 58 and limit switches 20, 22, 28 and 30 would be eliminated—also, that a combination of mechanical drive and power cylinders can be used, if desired, in the apparatus, including dual takeup units on the conveyor, can be provided to insure that the article hangers or supports provided thereon will move past the article transfer station in accurately timed relationship to each other.

FIGS. 6 and 7 of the drawings show diagrammatically an alternate mechanical power unit for operating the transfer apparatus of the invention and particularly for driving the conveyor means 34, and similar portions of the apparatus shown in FIGS. 1 through 5. In this instance, conveyors 10a and 12a are shown, and a sprocket 125 engages or meshes with the conveyor chain used for the conveyor 10a and it is secured to a shaft 126 journaled on a frame indicated diagrammatically at 70a. The shaft 126 also has a sprocket 127 secured thereto and such sprocket drives a suitable chain or belt 127a that extends to and is engaged with a sprocket 129 that preferably is eccentrically mounted on a shaft 129a journaled on the frame 70a. A chain tightener, including a shaft 131, is secured to the frame and it has an arm 132 pivotally extending therefrom, which arm has a suitable sprocket 133 journaled thereon. The arm 132 is urged at all times, as by a spring 134 attached to the arm and biasing it outwardly of the chain 127a at all times whereby an automatic takeup action is provided for the chain 127a depending upon the position of the sprocket 129. The chain 127a engages the sprocket 133 and by this eccentric positioning of the sprocket 129, the desired or proper timing for the transfer mechanism of the invention in its transfer action can be provided.

Drive from the sprocket 129 is taken, as by a crank arm 135, operatively attached to the sprocket 129 offset from the center thereof whereby an eccentric driving action is provided for this crank arm 135 which is keyed to the shaft 129a and which engages a connecting link 136 to form driving connection therewith. Such connecting link 136 in turn pivotally engages the rack 137 shown in the drawing and effectively reciprocates such rack, which rack 137 is the equivalent of the rack 46 in FIGS. 1 through 5, by rotation of the arm 135. Thus, a timed reciprocation of the rack 137 is provided and this is performed or driven in timed relationship to movement of the conveyor or conveyor chain 10. The link arm 101 and sprocket 62 shown in FIGS. 1 through 5 can be driven in a similar manner from the drive sprocket actuated by the conveyor 12a (not shown).

It also is possible to take direct drive from the sprocket 125 and transfer it to the conveyor 12a for positive correlation of the timed mechanical driving action of the conveyor 12 in relation to the drive of the conveyor 10a. Thus, a drive sprocket 139 is shown in engagement with the conveyor 12a and such sprocket can be driven through a sprocket or gear 139a secured to a shaft 143 on which the sprocket 139 is also positioned. The shaft 143 is shown driven by a gear 143a carried on a shaft 149 and it receives drive, for example, from a sprocket 147 engaging a drive chain 147a which effectively connects the shaft 126 to the shaft 149 and a direct mechanical drive is produced.

Any suitable control can be used to actuate the cylinder 128 for return movement of the transfer frame 70 at any time after the hanger means 77 has been picked off the conveyor 10. The cylinder 128 is supported by crossbars or brackets 148 secured to and extending between the I-beams or from the I-beam 120.

FIG. 7 is a diagrammatic showing of the apparatus of FIG. 6.

An effective automatic article transfer apparatus has been provided for removing articles from one conveyor and transferring the articles, usually on a hanger support, to a second conveyor for movement therewith.

Hence, the objects of the invention have been achieved.

The extension link 144 is indicated in dotted lines in FIG. 4 in the position it should be in when the piston in the cylinder 42 is fully retracted.

While two complete embodiments of the invention have been disclosed herein, it will be appreciated that modification of these particular embodiments of the invention may be resorted to without departing from the scope of the invention as defined in the appended claims.

What I claim is:

1. Apparatus for automatic transfer of articles from one conveyor to an adjacent second conveyor, said conveyors having parallel courses at the points of transfer, and comprising
    frame means positioned between said conveyors,
    endless chain means journaled on said frame means for movement from adjacent one conveyor to a point adjacent the second conveyor,
    pickoff means secured to said chain means to engage an article on said one conveyor, disengage it therefrom, and move it to a point adjacent said second conveyor,
    drive means connecting to said chain means to move it through a controlled oscillating path,
    an article deposit means on said frame means adjacent said second conveyor to engage an article on said pickoff means and disengage it therefrom, and
    control means engaging said article deposit means to control the position thereof and oscillate said article deposit means for article release onto said second conveyor.

2. Apparatus as in claim 1 where said articles are secured to said conveyors by a hanger having an upper bar extending longitudinally of said first conveyor, and a pair of arms form said pickoff means, said arms being positioned and movable to engage spaced portions of said bar to lift it off of said first conveyor to move said hanger substantially perpendicularly away from the longitudinal axis of said first conveyor towards said second conveyor.

3. Apparatus as in claim 2 where a pair of pivotally positioned support arms form said article deposit means and such support arms are positioned in the course of movement of said first-named arms to in turn pick off said hanger as moved toward said second conveyor by said chain means.

4. Apparatus as in claim 1 where a mechanical drive is taken from said first conveyor, and means connect said mechanical drive to said drive means and control means for timed actuation thereof.

5. Apparatus as in claim 1 where said reversible drive means include a rack gear controlled by a piston and cylinder means, means connecting said rack gear operatively to said chain means for driving the same through a controlled reversible arc.

6. Apparatus as in claim 1 where said control means comprise circuit means including switch means operatively associated with said second conveyor to be actuated by movement of said conveyor to actuate said control means for timed deposit of an article onto said second conveyor.

7. Apparatus as in claim 1 where said control means are connected operatively to said article deposit means for driving the same through a controlled reversible arc.

8. Apparatus for automatic transfer of articles from one endless chain conveyor to an adjacent second endless chain conveyor, said conveyors having parallel courses at the points of transfer and having dependent supports thereon, said articles being secured to said first conveyor by a hanger having an upper bar extending longitudinally of said first conveyor, and comprising
    frame means positioned between said conveyors,
    a pair of parallel endless chain means journaled on said frame means for movement from adjacent one conveyor to a point adjacent the second conveyor,
    pickoff means secured to said chain means to engage a hanger on said one conveyor, disengage it therefrom, and move it to a point adjacent said second conveyor,
    drive means connecting to said chain means to move it through controlled oscillating path,
    an article deposit means operatively positioned on said frame means adjacent said second conveyor to engage a hanger on said pickoff means and disengage it therefrom, and
    control means engaging said article deposit means to control the position thereof and oscillate said article deposit means for hanger release and positioning on said second conveyor.

9. Apparatus as in claim 8 where said frame means are positioned for movement parallel to said conveyor, and means operatively engage said frame means to move it in synchronism with said one conveyor for a short portion of its movement.

10. Apparatus as in claim 8 where said frame means are positioned for movement parallel to the parallel courses of said conveyors, and slidable bar means adapted in one position to operatively engage said frame means with said one conveyor to move said frame means in synchronism downstream with said one conveyor while an article is being picked therefrom.

11. Apparatus as in claim 10 where a return means operatively engages said frame means to move it upstream, and means disengage said bar means from said one conveyor.

12. Apparatus as in claim 8 where said control means also control said drive means and comprise circuit means including switch means operatively associated with said conveyors to be actuated by movement of said conveyors to actuate said drive means and said control means for timed pickup and/or deposit of articles from or onto said conveyor.

13. Apparatus for automatic transfer of articles supported on a hanger from one conveyor to an adjacent second conveyor, said conveyors having parallel courses at the points of transfer, and comprising
    frame means positioned between said conveyors,
    a pair of driven endless means journaled on spaced side portions of said frame means for movement from adjacent one conveyor to a point adjacent the second conveyor,
    pickoff means secured to each of said endless means to engage an article hanger on said one conveyor, disengage it therefrom, and move it to a point adjacent said second conveyor,
    pivotally positioned article deposit means on said frame means adjacent said second conveyor to engage an article hanger on said pickoff means and disengage it therefrom, and intermittently actuated control means operatively engaging said article deposit means to control the position thereof and move said article deposite means through a controlled reversible arc for article hanger release and deposit onto said second conveyor.